Feb. 7, 1956

C. A. LUCAS 2,733,495

MOLD FOR HOLLOW ARTICLES

Filed Aug. 14, 1952

Inventor
Cecil A. Lucas
by Robert J. Keating
his atty.

United States Patent Office 2,733,495
Patented Feb. 7, 1956

2,733,495

MOLD FOR HOLLOW ARTICLES

Cecil A. Lucas, Waltham, Mass., assignor, by mesne assignments, to American Vault Corp., Belmont, Mass., a corporation of Massachusetts Application August 14, 1952, Serial No. 304,395

2 Claims. (Cl. 25—130)

In the manufacture of molded hollow articles of various geometric shapes such as concrete vaults, containers, etc., it is necessary to provide an inner member or core and an outer member which is disposed in properly spaced relation to the inner member so as to define the mold cavity or part thereof. After the casting or molding operation, the inner and outer members must be stripped and reassembled for the next molding operation. To this end the inner and outer members usually comprise an assembly of interfitting parts which collectively define one or more walls of the mold and in the course of producing molded articles the time required to assemble and dismember such parts adds considerably to the cost of manufacture.

The principal object of the present invention is to provide a mold having inner and/or outer members which may be readily assembled preparatory to casting and subsequently stripped from the cast article without completely dismembering the parts, thereby effecting a substantial saving in time and reduction in manufacturing costs.

Further objects relate to features of construction and will be apparent from a consideration of the following description and accompanying drawings, wherein.

Figure 1:
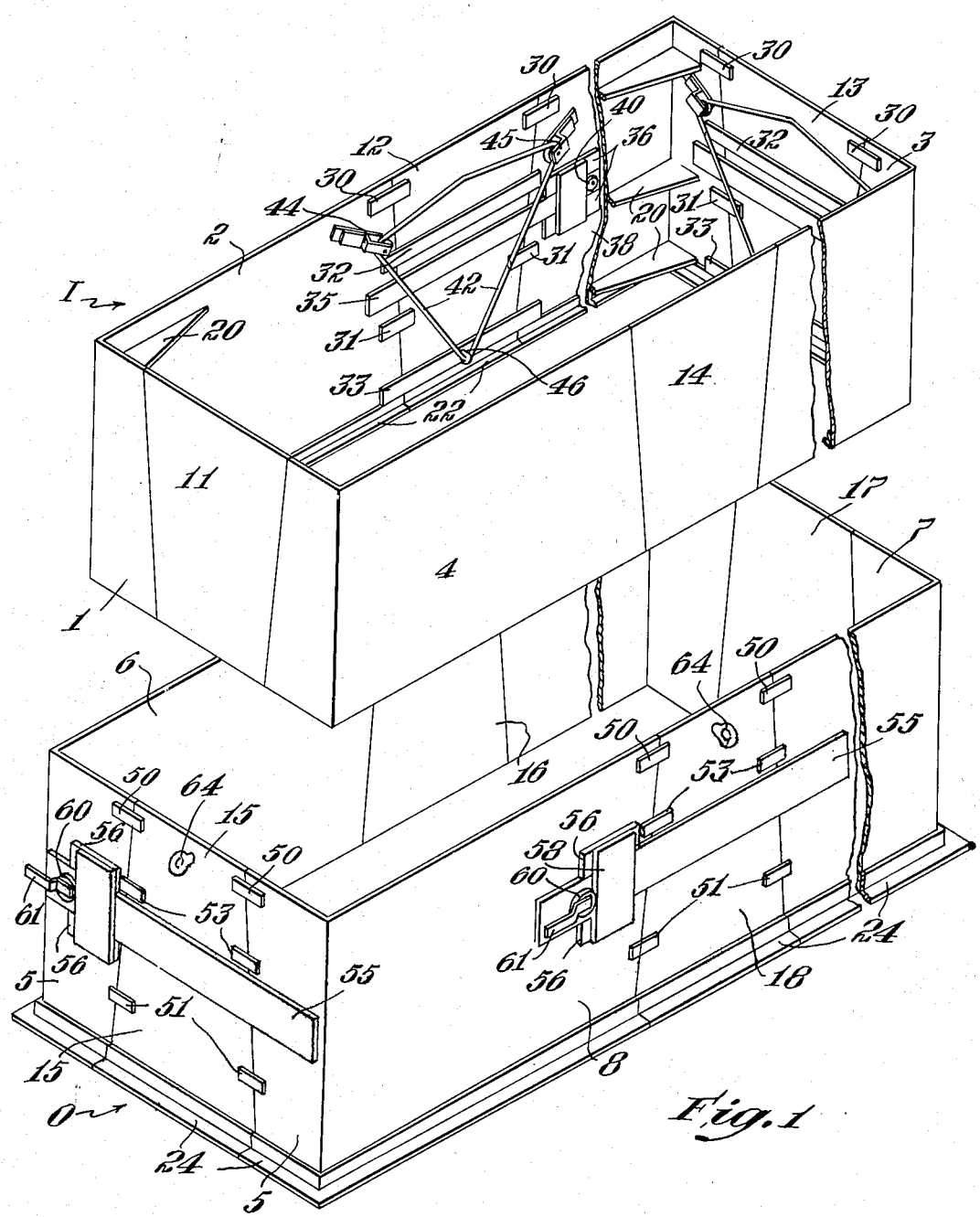
Fig. 1 is a composite isometric view showing the construction and arrangement of parts constituting the inner and outer sections of a mold embodying the invention.

In accordance with the present invention, I provide a mold having inner and outer sections spaced to define the mold cavity, and these sections may or may not be geometrically similar, depending upon the particular article to be cast or molded. Either or both sections may, for example, have the shape of a cylinder, polygon or other figure, but in any case one of both sections have at least one wall provided with a wedge-shaped part (hereinafter called the wedge) movable in suitable guides outwardly relative to the mold cavity and other parts of the wall so as to vary the normal length or area of the wall, i. e., either lengthen or reduce the wall, depending on whether it is an outside or an inside wall. Any of various suitable means are provided to move the wedge outwardly and simultaneously effect the aforesaid variation in the normal length which then permits the wall to be stripped from a cast article within the mold cavity.

The number of such wedges will, as a practical matter, depend upon the particular size and shape of the article to be cast and as a general rule one wedge for each wall is preferably employed. The degree of outward movement of the wedge will depend on its angularity, but in any case the outward movement should be sufficient to lengthen or reduce the wall the slight amount necessary (the order of a few inches) to effect or permit stripping the wall from the cast article and consequent removal thereof, after which the bottom wall or other parts of the mold may be removed as hereinafter illustrated.

Where, as is preferred, the walls of one or both sections are provided with wedges, the latter are so designed that their outward movement is limited so that the entire wall including the wedge is removable as a unit. In order to insure the optimum advantages when casting polygonal shapes, each wall of both sections is provided with a wedge and the intervening portions of the walls defining the corners are integrally joined so that the entire section constitutes a unit. When so designed the wedges may be simultaneously drawn outwardly, in which event the reduction in length of the inner walls has the effect of contracting the inner section and the lengthening of the outer walls has the effect of expanding the outer section. With the proper equipment both operations can be accomplished in a single operation with the result that the inner and outer sections may be stripped in a matter of a few seconds, after which the wedges may be moved inwardly to normal position preparatory to the next casting operation.

As illustrative of its utility the invention is herein shown as applied to or embodied in a mold for casting concrete vaults and the like simple geometric shapes, it being understood that the same principles are applicable to other or more complicated shapes. Since the fluidity of a suitable concrete mix is extremely low, it is more feasible to cast the vault in an up-side-down position, thereby insuring a complete filling of the mold, after which the mold and cast vault are turned right-side-up for stripping and finishing; and the foregoing should be borne in mind in connection with the following description.

Referring to Fig. 1, the mold comprises an inner section I having side walls 1, 2, 3 and 4, and an outer section O having side walls 5, 6, 7 and 8, the side walls of the inner section having wedge-shaped parts or wedges 11, 12, 13, and 14, and the side walls of the outer section also having wedges 15, 16, 17 and 18. The construction and arrangement of the wedges with respect to the associated walls of the inner section are substantially identical and the same is true with respect to the wedges of the outer section.

Between the wedges 11–14, the adjoining walls 1–4 are welded or otherwise integrally joined together and braced by reinforcing webs 20 and angle iron members 22 extend around the lower inner faces of the wedge-shaped parts and walls, the utility of which is hereinafter pointed out. Likewise the corresponding wall portions of the outer section are integrally joined, and the lower outer faces are provided with angle iron members 24.

Figure 2:
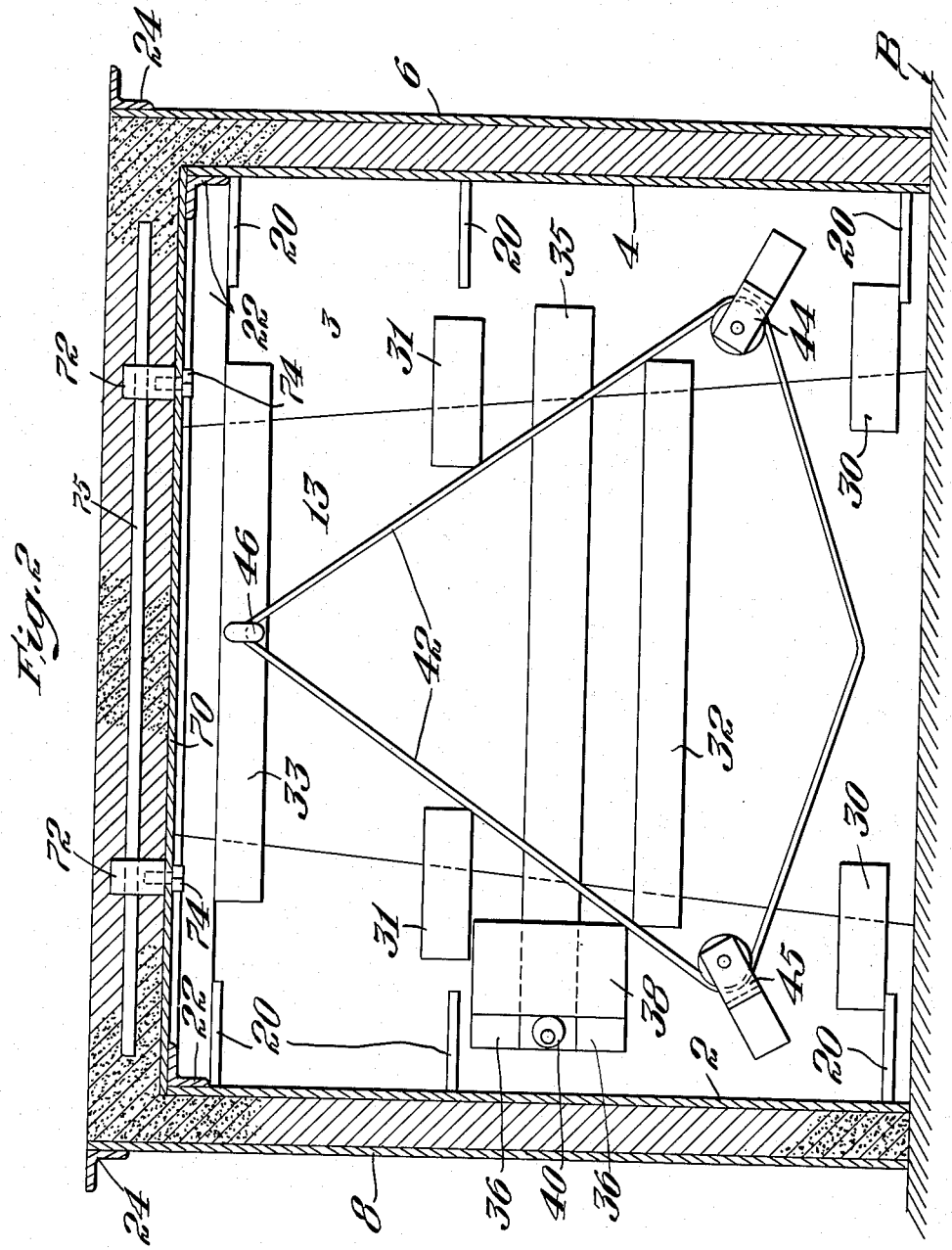
Fig. 2 is a vertical transverse section through the mold showing the relationship of the inner and outer sections preparatory to and immediately after molding.
Figure 3:
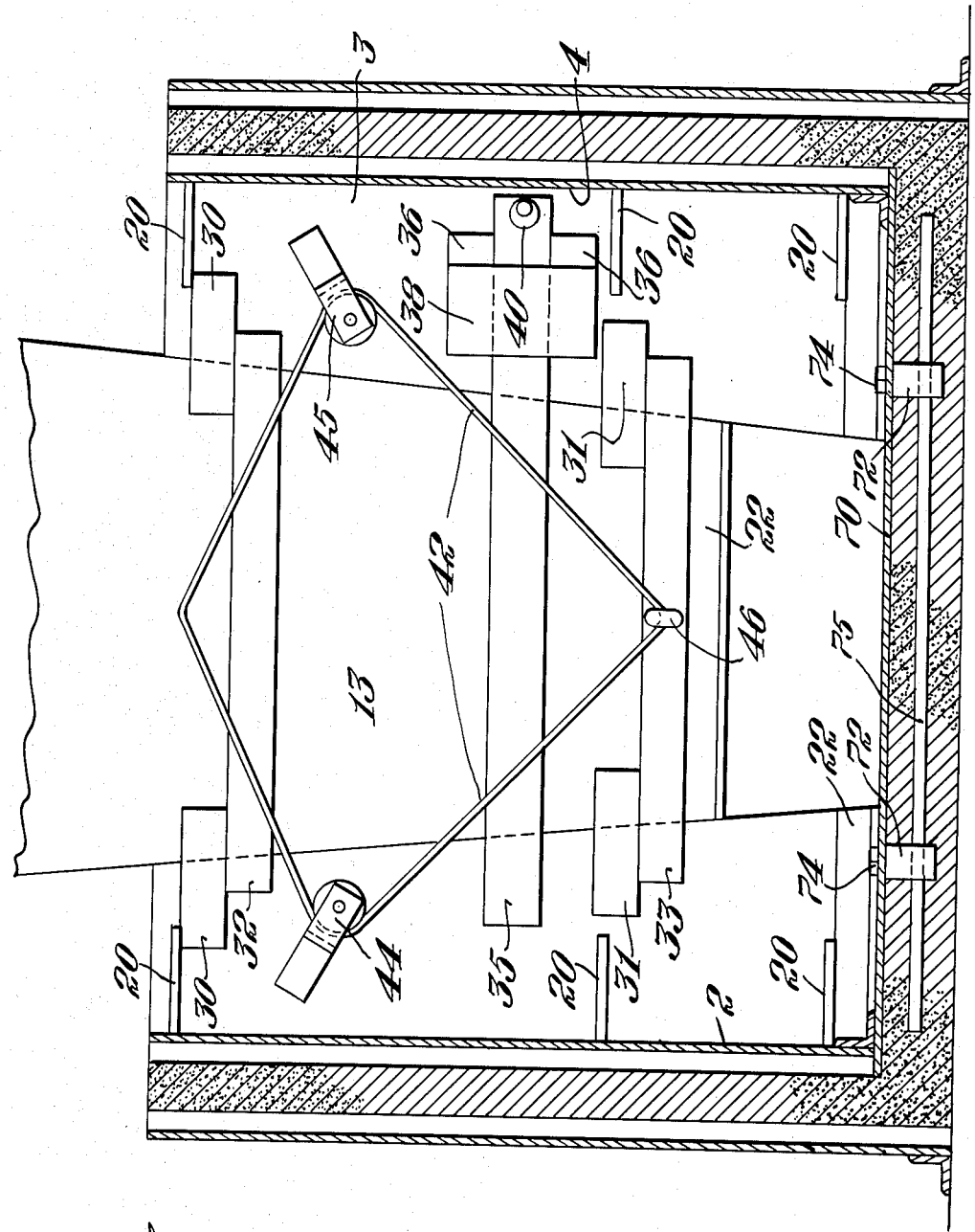
Fig. 3 is a vertical transverse section through the mold after it has been rotated 180° and illustrating the initial step in stripping the inner section.

Referring to Figs. 1–3, each wedge is in the form of a trapezoid and is supported for inward and outward movement by guides or ways comprising upper and lower pairs of lugs 30, 31 welded or otherwise secured to the inner face of the adjacent wall sections so as to project beyond the junction with the wedge and hold it against being displaced inwardly; and upper and lower bars 32 and 33 are welded or otherwise secured to the inner face of the wedge and project beyond the junction with the wall section to hold the wedge against outward displacement. The lugs and bars not only provide guides, but the lugs are so arranged with respect to the bars that they provide stops for limiting the outward movement of the wedges, as shown in Fig. 3.

In order to compensate for wear and effect the slight adjustments necessary to prevent a gap from developing between the edges of each wedge and those of the adjacent wall sections, one end of a bar 35 is welded or otherwise secured to one section of the wall and extends across the wedge so as to project along side of the other section of the wall between a pair of guides 36 which are welded or otherwise attached to the latter wall section. An abutment 38 is secured to the guides 36 so as to overlie the opposite end of the bar 35 which carries an eccentrically mounted roller or cam 40 formed with an extension by means of which it may be rotated. When the wedge is in normal position (Fig. 1) with its edge flush with the edges of the wall sections, rotation of the eccentric 40 is effective to close any gap and the adjustment thus made may, if desired, be held by a set screw or the like means for locking the cam.

It will be observed that the wedge of each wall of the upper section holds the parts against contracting movement and accidental expansion movement is prevented by the cam 40 acting on the bar 35; but when the wedge is moved outwardly to extended position (Fig. 3) the wall sections are free to move toward each other since the cam is moved away from the abutment 38.

The simultaneous movement of the wedge to extended position and the contracting movement of the wall section are here shown as being accomplished by a cable 42 extending about pulleys 44 and 45 carried by the wall sections and a pin 46 or the like anchored to the bar 33. When a lifting force is applied to the upper central part of the cable 42 the wedge is lifted or moved outwardly and the two wall sections are simultaneously drawn toward each other until the bars 32, 33 engage the stops 30, 31, at which time the entire wall is moved as a unit. Since each wall is provided with the same mechanism, the same lifting force applied to each cable is operative to contract the entire section.

Figure 4:
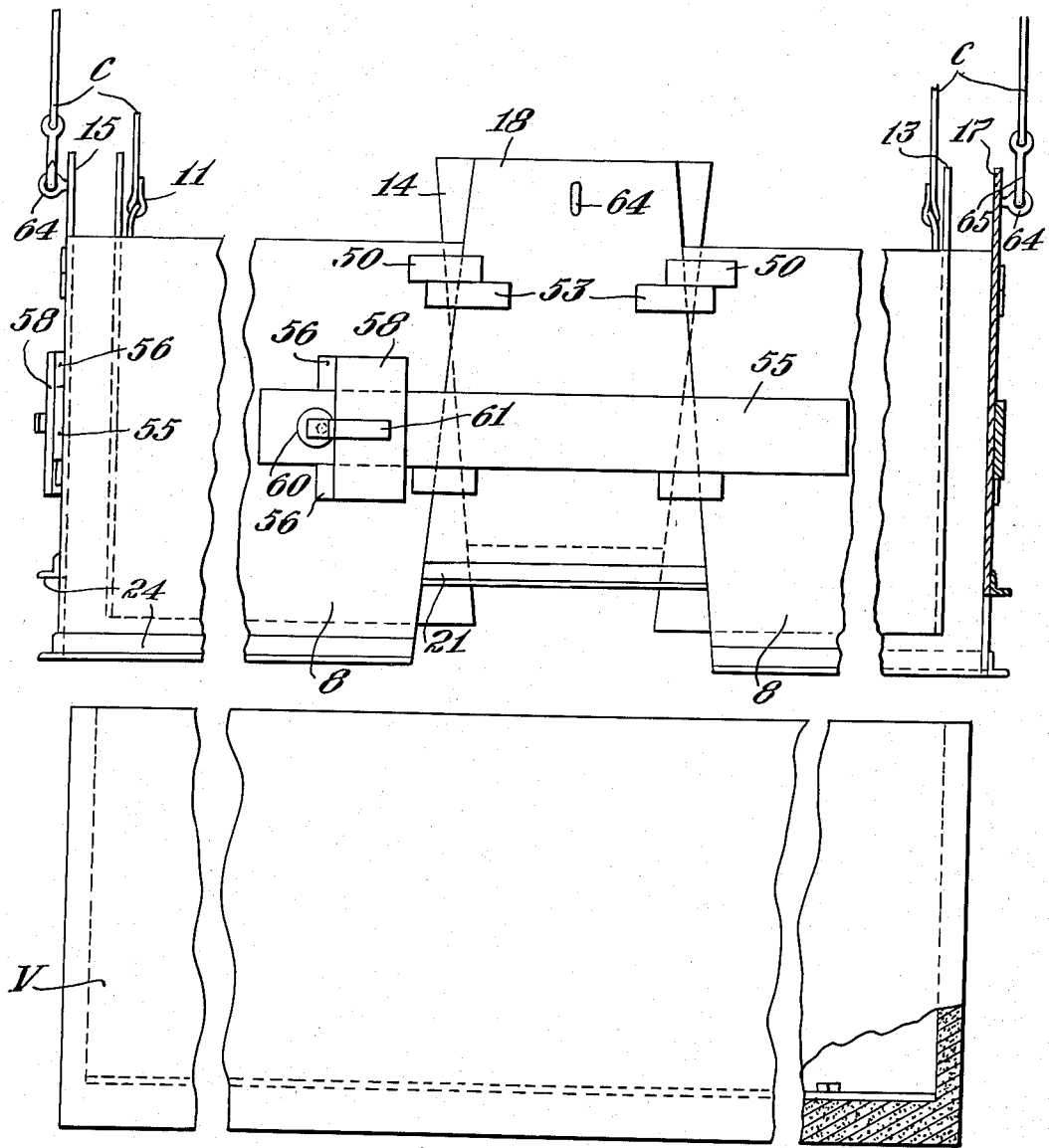
Fig. 4 is a side elevation showing how the mold is stripped from the cast article.

The construction of the wedge and associated parts of the outer section are substantially identical to the corresponding parts of the inner section except that the position of the wedge and adjusting cam is reversed. As shown in Figs. 1 and 4, each wedge is supported for inward and outward movement by guides comprising upper and lower lugs 50, 51 secured to the outer face of the adjacent wall sections so as to project beyond the junction with the wedge and hold it against outward displacement, and centrally disposed lugs 53 are secured to the outer face of the wedge with their opposite ends extending beyond the junctions with the adjacent wall sections holding the wedge against inward displacement. Here again the lugs not only provide guides, but also stops limiting the outward movement of the wedges, as shown in Fig. 4.

Compensation for wear is provided by a bar 55, one end of which is secured to one wall section and the other end of which is positioned between a pair of guides 56 secured to the other wall section. An abutment 58 is secured to the guides 56 so as to overlie the opposite end of the bar 55 which carries an eccentric roller or cam 60 engaged with the inner edge of the abutment. Each cam is provided with a handle 61 or other means by which it may be rotated to effect the necessary adjustments and a set screw (not shown) may be provided to lock it in adjusted position. With this construction and arrangement of parts the cams 60 may be adjusted so as to hold the walls of the outer section against expanding movement, but may be rotated so as to permit the walls to expand enough to allow stripping from the cast article.

The movement of the wedges to extended position and the expanding movement of the wall sections (Fig. 4) may be accomplished simply by lifting the wedges upwardly, and to this end an eye 64 is secured to the upper part of each wedge so as to receive a lifting hook 65 (Fig. 4) or the like. Reverse movement of the walls to contracted position may be easily effected by manual pressure applied to the corners of the section.

Since as above noted, it is the practice to cast vaults, tanks and the like articles up-side-down, in assembling the sections preparatory to the casting or molding the parts shown in Fig. 1 are reversed and assembled as shown in Fig. 2. The outer faces of the inner section I and the inner faces of the outer section O are first preferably oiled to facilitate stripping, and the assemblage is mounted on an oiled floor or base member B. After adjusting the inner section I and the cams 60 of the outer section O so as to provide a mold cavity of the desired size, the bottom wall of the mold, consisting of a sheet 70 of heavy gauge metal of the proper size and shape is laid on the top of the inner section, being supported by angle irons 22. The outer face of this sheet is then oiled and reinforcing elements are laid on the sheets, these reinforcing elements comprising blocks 72 which are drilled and threaded to receive removable bolts 74 which project upwardly through openings in the wall 70 and not only serve to hold the blocks 72 in position during the casting operation, but after the vault has been completed and the bolts 74 removed, these blocks provide receivers or anchors for lugs or coupling members by means of which the vault when turned right-side-up may be lifted. The blocks 72 are also drilled transversely to receive reinforcing rods 75, it being understood that several pairs of blocks and rods are used and that if desired conventional reinforcing wire mesh may also be applied over the rods 75 and in the cavity defined by the inner and outer sections.

Having assembled the parts as shown in Fig. 3, the concrete mix is then poured into the mold and forced into the cavity so as completely to fill it, as indicated in Fig. 2, and the outer surface is smoothed off by a screed supported on the angle irons 24 after which it is troweled to form a smooth dense surface. After the concrete has set (usually about twenty-four hours) the mold is rotated to bring the vault V to right-side-up position (Figs. 3 and 4); the cams 60 are rotated to the position shown in Fig. 4, and by means of a crane equipped with a cross-shaped beam having a pair of cables C depending from each of its four arms, the inner and outer sections are simultaneously withdrawn, as illustrated in Fig. 4, it being understood that the lifting force of the cables contracts the inner section and expands the outer section and thus strips them from the inner and outer faces of the vault V. After having removed the sections I and O the bolts 74 are removed and the bottom wall 70 is then lifted out. Thereafter the vault is finished off in the usual manner.

In reassembling the part preparatory to the next casting operation, the inner section is lowered on the freshly oiled base B and its wedges forced back to normal position, after which the outer faces may be oiled. The outer section with its inner faces oiled is then lowered in position about the inner section, after which its wedges are dropped back to normal position, and the walls are manually contracted. The bottom wall and reinforcements are applied as above described and the casting operation repeated.

It is apparent from the foregoing that the assembly and stripping of the sections may be readily accomplished in a fraction of the time that is required when using a mold of conventional construction and with the proper equipment available for handling the sections production costs involved in the casing operation are greatly reduced.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A mold of a character described comprising inner and outer non-collapsible sections having spaced walls defining the mold cavity, the inner section having a plurality of walls defining a polygon, the adjoining corners of which are rigidly connected, at least one of said walls having a wedge-shaped part between its ends extending from one edge to the other, said wedge-shaped part being movable outwardly relative to said cavity and the other parts of said wall so that the normal length thereof may be varied, interengaging means carried by said wedge-shaped part and said other parts for guiding the wedge-shaped part and limiting its outward movement so as to prevent separation of the parts, the inner face of one of said walls carrying an adjusting means operative to vary the relative position of said other parts so as to close any gap between the parts when said wedge-shaped part is in its lowermost position, and means for moving said wedge-shaped part outwardly and simultaneously effecting a variation in the normal length of said wall, thereby to permit the inner section to be stripped from a cast article within said cavity.

2. A mold of a character described comprising inner and outer non-collapsible sections having spaced walls defining the mold cavity, the outer section having a plurality of walls defining a polygon, the adjoining corners of which are rigidly connected, at least one of said walls having a wedge-shaped part between its ends extending from one edge to the other, said wedge-shaped part being movable outwardly relative to said cavity and the other parts of said wall so that the normal length thereof may be varied, interengaging means carried by said wedge-shaped part and said other parts for guiding the wedge-shaped part and limiting its outward movement so as to prevent separation of the parts, the outer face of one of said walls carrying means operative to lock said other parts in relatively fixed position during the molding operation, and means for moving said wedge-shaped part outwardly and simultaneously effecting a variation in the normal length of said wall, thereby to permit the outer section to be stripped from a cast article within said cavity.

References Cited in the file of this patent

UNITED STATES PATENTS

| | | |
|---|---|---|
| 705,789 | Reeves | July 29, 1902 |
| 936,861 | Brown | Oct. 12, 1909 |
| 955,235 | Wellman | Apr. 19, 1910 |
| 1,001,553 | Reilly | Aug. 22, 1911 |
| 1,020,005 | Witthoefft | Mar. 12, 1912 |
| 1,344,115 | Cresmer | June 22, 1920 |